(12) United States Patent
Xu et al.

(10) Patent No.: US 12,317,284 B2
(45) Date of Patent: May 27, 2025

(54) INFORMATION RECEIVING AND SENDING METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventors: Jing Xu, Guangdong (CN); Bin Liang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 412 days.

(21) Appl. No.: 17/819,537

(22) Filed: Aug. 12, 2022

(65) Prior Publication Data
US 2022/0386354 A1 Dec. 1, 2022

Related U.S. Application Data

(63) Continuation of application No. PCT/CN2020/075389, filed on Feb. 14, 2020.

(51) Int. Cl.
*H04W 72/23* (2023.01)
*H04W 72/1268* (2023.01)

(52) U.S. Cl.
CPC ....... *H04W 72/23* (2023.01); *H04W 72/1268* (2013.01)

(58) Field of Classification Search
CPC .......................... H04W 72/1268; H04W 72/23
USPC ........................................................ 370/336
See application file for complete search history.

(56) References Cited

U.S. PATENT DOCUMENTS

| 2019/0149380 | A1 | 5/2019 | Babaei et al. | |
| 2020/0119953 | A1* | 4/2020 | Chen | H04W 52/325 |
| 2020/0127790 | A1 | 4/2020 | Jiao et al. | |
| 2020/0162212 | A1 | 5/2020 | Liu et al. | |
| 2020/0228212 | A1* | 7/2020 | Xu | H04L 27/2602 |

(Continued)

FOREIGN PATENT DOCUMENTS

| CN | 108702281 A | 10/2018 |
| CN | 108934068 A | 12/2018 |

(Continued)

OTHER PUBLICATIONS

Supplementary European Search Report in the European application No. 20918162.7, mailed on Mar. 16, 2023. 11 pages.

(Continued)

*Primary Examiner* — Peter G Solinsky
(74) *Attorney, Agent, or Firm* — PERKINS COIE LLP

(57) ABSTRACT

An information receiving and sending method, a terminal device, a network device, a chip, a computer-readable storage medium, a computer program product and a computer program are provided. The method comprises: the terminal device receiving downlink control information (DCI) and using a target transmission parameter to analyze a first DCI domain in the DCI. The DCI comprises at least one DCI domain, and the first DCI domain is one of the at least one DCI domain. The target transmission parameter comprises at least one first transmission parameter, or at least one second transmission parameter, or at least one first transmission parameter and at least one second transmission parameter.

13 Claims, 9 Drawing Sheets

41: A terminal receives a first transmission parameter and a second transmission parameter 42: The terminal receives DCI for CG activation

(56) References Cited

U.S. PATENT DOCUMENTS

| | | | |
|---|---|---|---|
| 2020/0280474 A1 | 9/2020 | Babaei et al. | |
| 2021/0036822 A1* | 2/2021 | Lyu | H04L 5/0048 |
| 2021/0204308 A1 | 7/2021 | Takeda et al. | |
| 2021/0314126 A1* | 10/2021 | Bae | H04L 1/1819 |
| 2022/0263617 A1 | 8/2022 | Liu et al. | |
| 2022/0337463 A1 | 10/2022 | Babaei et al. | |
| 2023/0063015 A1* | 3/2023 | Muruganathan | H04L 5/0035 |

FOREIGN PATENT DOCUMENTS

| | | | |
|---|---|---|---|
| CN | 109150449 A | 1/2019 | |
| EP | 3840271 A1 | 6/2021 | |
| EP | 3860068 A1 | 8/2021 | |
| WO | 2018126401 A1 | 7/2018 | |
| WO | 2019127197 A1 | 7/2019 | |
| WO | 2019224875 A1 | 11/2019 | |

OTHER PUBLICATIONS

LG Electronics. "Enhanced UL configured grant transmission for NR URLLC" 3GPP TSG RAN WG1 #98bis, R1-1910831, Oct. 7, 2019 (Oct. 7, 2019), entire document (3 pages).

International Search Report in the international application No. PCT/CN2020/075389, mailed on Oct. 29, 2020 with English translation (6 pages).

English translation of the Written Opinion of the International Search Authority in the international application No. PCT/CN2020/075389, mailed on Oct. 29, 2020 (9 pages).

First Office Action of the European application No. 20918162.7, issued on Nov. 22, 2023. 10 pages.

* cited by examiner

A terminal device receives DCI, and parses a first DCI field in the DCI by using a target transmission parameter ⟋ 21

FIG. 2

A network device sends DCI, a first DCI field in the DCI being determined according to a target transmission parameter ⟋ 31

FIG. 3

INFORMATION RECEIVING AND SENDING METHOD, TERMINAL DEVICE AND NETWORK DEVICE

CROSS-REFERENCE TO RELATED APPLICATION

This is a continuation application of International Patent Application No. PCT/CN2020/075389, filed on Feb. 14, 2020, entitled "INFORMATION RECEIVING AND SENDING METHOD, TERMINAL DEVICE AND NETWORK DEVICE", the disclosure of which is hereby incorporated by reference in its entirety.

BACKGROUND

In the related art, an order of respective fields and the number of bits for each field in a Downlink Control Information (DCI) format are definite. For Configured Grant (CG) transmission, bits for each field in DCI for CG activation and CG retransmission may be determined based on different parameters. When configurations of the same parameter in different transmission parameters are different, number of bits for a certain bit field in DCI determined based on the same parameter will be different. Therefore, in such case, how to determine the number of bits for a DCI field in DCI for further parsing becomes a problem needs to be solved.

SUMMARY

The present application relates to the field of communication, and particularly to an information receiving method, an information sending method, a terminal device, a network device, a chip, a computer-readable storage medium, a computer program product, and a computer program.

According to a first aspect, there is provided an information receiving method, which may include the following operation.

A terminal device receives DCI, and parses a first DCI field in the DCI by using a target transmission parameter, the DCI including at least one DCI field, and the first DCI field being one of the at least one DCI field.

The target transmission parameter may include: at least one first transmission parameter, or at least one second transmission parameter, or at least one first transmission parameter and at least one second transmission parameter.

According to a second aspect, there is provided an information sending method, which may include the following operation.

A network device sends DCI, a first DCI field in the DCI being determined according to a target transmission parameter, the DCI including at least one DCI field, and the first DCI field being one of the at least one DCI field.

The target transmission parameter may include: at least one first transmission parameter, or at least one second transmission parameter, or at least one first transmission parameter and at least one second transmission parameter.

According to a third aspect, there is provided a terminal device, which may include a first communication unit and a first processing unit.

The first communication unit may receive DCI.

The first processing unit may parse a first DCI field in the DCI by using a target transmission parameter, the DCI including at least one DCI field, and the first DCI field being one of the at least one DCI field.

The target transmission parameter may include: at least one first transmission parameter, or at least one second transmission parameter, or at least one first transmission parameter and at least one second transmission parameter.

According to a fourth aspect, there is provided a network device, which may include a second communication unit.

The second communication unit may send DCI, a first DCI field in the DCI being determined according to a target transmission parameter, the DCI including at least one DCI field, and the first DCI field being one of the at least one DCI field.

The target transmission parameter may include: at least one first transmission parameter, or at least one second transmission parameter, or at least one first transmission parameter and at least one second transmission parameter.

According to a fifth aspect, there is provided a terminal device, which may include a processor and a memory configured to store a computer program capable of running on the processor.

The memory may be configured to store the computer program. The processor may be configured to call and run the computer program stored in the memory to execute the operations of the above-mentioned method.

According to a sixth aspect, there is provided a network device, which may include a processor and a memory configured to store a computer program capable of running on the processor.

The memory may be configured to store the computer program. The processor may be configured to call and run the computer program stored in the memory to execute the operations of the above-mentioned method.

According to a seventh aspect, there is provided a chip, which may include a processor, configured to call and run a computer program in a memory to cause a device installed with the chip to execute the method as described above.

According to an eighth aspect, there is provided a computer-readable storage medium, configured to store a computer program which causes a computer to execute the operations of the above-mentioned methods.

According to a ninth aspect, there is provided a computer program product, including computer program instructions which cause a computer to execute the above-mentioned methods.

According to a tenth aspect, there is provided a computer program, which causes a computer to execute the above-mentioned methods.

BRIEF DESCRIPTION OF THE DRAWINGS

FIG. 2 is a schematic flowchart of an information receiving method according to an embodiment of the present disclosure.

FIG. 3 is a schematic flowchart of an information sending method according to an embodiment of the present disclosure.

DETAILED DESCRIPTION

In order to make the characteristics and technical contents of the embodiments of the present disclosure understood in more detail, the implementation of the embodiments of the present disclosure will be described below in combination with the drawings in detail. The drawings are appended only for description as references and not intended to limit the embodiments of the present disclosure.

The technical solutions in the embodiments of the application will be described below in combination with the drawings in the embodiments of the application. It is apparent that the described embodiments are not all but part of embodiments of the application. All other embodiments obtained by those of ordinary skill in the art based on the embodiments in the application without creative work shall fall within the scope of protection of the application.

The technical solutions of the embodiments of the application may be applied to various communication systems, for example, a Long Term Evolution (LTE) system, an LTE Frequency Division Duplex (FDD) system, LTE Time Division Duplex (TDD), a 5th-Generation (5G) system, or a future communication system.

Figure 1:
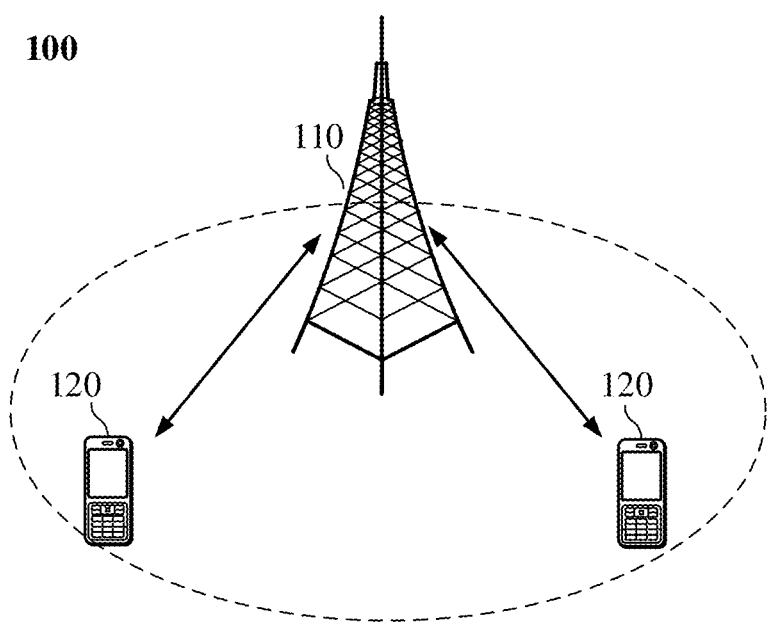
FIG. 1 is a first schematic diagram of an architecture of a communication system according to an embodiment of the present disclosure.

Exemplarily, a communication system 100 that the embodiments of the application are applied to may be as illustrated in FIG. 1. The communication system 100 may include a network device 110. The network device 110 may be a device communicating with User Equipment (UE) 120 (or referred to as a communication terminal device or a terminal device). The network device 110 may provide a communication coverage for a specific geographical region and communicate with UE in the coverage. Optionally, the network device 110 may be an Evolutional Node B (eNB or eNodeB) in the LTE system, or a wireless controller in a Cloud Radio Access Network (CRAN). Alternatively, the network device may be a mobile switching center, a relay station, an access point, a vehicle device, a wearable device, a hub, a switch, a network bridge, a router, a network-side device in the 5G network, a network device in a future evolved network, or the like.

The communication system 100 further includes at least one piece of UE 120 within the coverage of the network device 110. The UE 120 may perform wired communication or wireless communication with the network device 110. The UE performing wireless communication with the network device 110 may be referred to as a "wireless communication terminal device", a "wireless terminal device", or a "mobile terminal device".

Optionally, Device to Device (D2D) communication may be performed between the UE 120.

During the early deployment of a 5G network, it is hard to achieve full coverage within short time for a relatively high frequency band, a relatively larger propagation loss, and other reasons. In addition, most of domestic and abroad operators currently use non-standalone solutions or combine non-standalone and standalone solutions to preempt 5G contention opportunities. If the 5G network is deployed according to a non-standalone architecture, a terminal is required to support a dual connectivity technology, and is simultaneously connected with 4th-Generation (4G) and 5G networks by use of double radio frequencies for double reception and double transmission. In such case, self-interferences are easily brought to the terminal due to the nonlinearity of a radio frequency device, etc. Here, the nonlinear interference mainly includes harmonic interference, intermodulation interference, and mixed-frequency interference. The intermodulation interference is one of interferences of great impact. How to eliminate intermodulation interferences is a key problem of joint networking of 5G and 4G LTE. Intermodulation interference signals may be sorted as multi-order, such as second-order and third-order, according to the number of the intermodulation interference signals affecting original signals. The solution provided in the application is mainly for processing second-order intermodulation interference signals of maximum power.

It is to be understood that terms "system" and "network" in the present disclosure may usually be interchanged herein. As used herein, term "and/or" is only an association relationship describing associated objects, and represents that three relationships may exist. For example, A and/or B may represent three conditions: i.e., independent existence of A, existence of both A and B, and independent existence of B. In addition, character "I" in the present disclosure usually represents that previous and next associated objects form an "or" relationship.

In order to make the characteristics and technical contents of the embodiments of the present disclosure understood in more detail, the implementation of the embodiments of the present disclosure will be described below in combination with the drawings in detail. The drawings are appended only for description as references and not intended to limit the embodiments of the present disclosure.

An embodiment of the present disclosure provides an information receiving method. As illustrated in FIG. 2, the method includes the following operation.

In operation 21, a terminal device receives DCI, and parses a first DCI field in the DCI by using a target transmission parameter, the DCI including at least one DCI field, and the first DCI field being one of the at least one DCI field.

The target transmission parameter may be one or more parameters, or a parameter set. The target transmission parameter may be pre-configured in the terminal, or may be configured for the terminal by a network device.

The target transmission parameter may include at least one first transmission parameter, or at least one second transmission parameter, or at least one first transmission parameter and at least one second transmission parameter.

If the target transmission parameter is configured for the terminal by the network device, the embodiment of the present disclosure also provides an information sending method. As illustrated in FIG. 3, the method includes the following operation.

In operation 31, a network device sends DCI, a first DCI field in the DCI being determined according to a target transmission parameter, the DCI including at least one DCI field, and the first DCI field being one of the at least one DCI field.

The composition of the target transmission parameter may refer to the related descriptions in the above embodiment. When the target transmission parameter includes at least one first transmission parameter and at least one second transmission parameter, the first transmission parameter is the same as or different from the second transmission parameter.

The solution provided in the embodiment of the application is particularly applied to a scenario where the first transmission parameter is different from the second transmission parameter.

The first transmission parameter is a CG transmission parameter. The second transmission parameter is an uplink data transmission parameter or a parameter predetermined in a protocol.

The uplink data transmission parameter may be a Physical Uplink Shared Channel (PUSCH) transmission parameter.

The first DCI field is one of all DCI fields included in the DCI. Alternatively, the first DCI field is one of part of DCI fields included in the DCI.

That is, the DCI may include multiple fields. Any one of all the DCI fields is understood as the first DCI field. Alternatively, any one of all the DCI fields may be processed by the solution provided in the embodiment.

Alternatively, the number of bits for only part of all DCI fields in the DCI may be determined according to the first transmission parameter and/or the second transmission parameter, and the other part of DCI fields may be DCI fields specified in the protocol. Any one of DCI fields that may be determined or parsed according to the first transmission parameter and/or the second transmission parameter may be referred to as the first DCI field in the embodiment. Any one of these DCI fields may be processed by the solution provided in the embodiment.

In the embodiment, a number of bits for the first DCI field is determined according to the at least one second transmission parameter. That is, the number of bits for the first DCI field may be determined in the following manner the terminal device or the network device determines the number of bits for the first DCI field according to the at least one second transmission parameter.

The operation that the terminal device parses a first DCI field in the DCI by using a target transmission parameter further includes the following operation.

The terminal device parses the first DCI field by using the target transmission parameter according to the number of bits for the first DCI field.

Correspondingly, the network device may configure the first DCI field according to the determined number of bits for the first DCI field and the target transmission parameter.

Based on the above, the solution provided in the embodiment will be described in detail in combination with the following several examples.

Example 1

When the first transmission parameter (such as a CG transmission parameter) is different from the second transmission parameter (such as an uplink data transmission parameter), bits for the first DCI field are determined according to the uplink data transmission parameter, and the first DCI field is parsed according to a minimum bit of the first DCI field.

Figure 4:
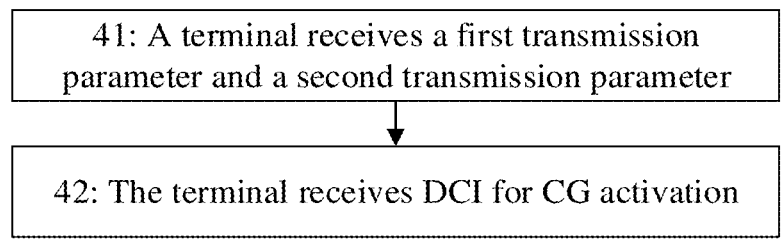
FIG. 4 is a schematic scenario diagram of a processing flow according to an embodiment of the present disclosure.

In combination with FIG. 4, the solution provided in the example may include the following operations.

In operation 41, the terminal device receives a first transmission parameter and a second transmission parameter. Correspondingly, the network device sends the first transmission parameter and the second transmission parameter to the terminal device.

In the example, subsequent descriptions will be made taking the first transmission parameter being Configured Grant Config and the second transmission parameter being PUSCH-Config as an example.

Bits for a first DCI field are determined according to PUSCH-Config (i.e., the second transmission parameter), and the first DCI field is parsed according to a minimum bit of the first DCI field. Correspondingly, the network device side determines the bits for the first DCI field according to PUSCH-Config (i.e., the second transmission parameter), and configures the first DCI field according to the minimum bit of the first DCI field.

Further, a first number of bits for the first DCI field is determined according to the at least one first transmission parameter, and a second number of bits for the first DCI field is determined according to the at least one second transmission parameter.

The target transmission parameter is the at least one first transmission parameter or at least one second transmission parameter, which corresponds to the minimum one between the first number of bits and the second number of bits.

That is, a method for determining the target transmission parameter may include the following operations. The first number of bits for the first DCI field is determined according to the at least one first transmission parameter, and the second number of bits for the first DCI field is determined according to the at least one second transmission parameter. The at least one first transmission parameter or at least one second transmission parameter corresponding to the minimum one between the first number of bits and the second number of bits is determined as the target transmission parameter.

That is, the minimum DCI bit configuration refers to the transmission parameter corresponding to the minimum one between the first number of bits and the second number of bits for the first DCI field. The first number of bits and the second number of bits are determined according to ConfiguredGrantConfig (the first transmission parameter) and PUSCH-Config (i.e., the second transmission parameter) respectively.

For example, the terminal device receives ConfiguredGrantConfig and PUSCH-Config from the network device.

A DMRS configuration parameter for DCI format 0-2 in PUSCH-Config, such as dmrs-UplinkForPUSCH-MappingTypeA-For DCI format 0-2 and dmrs-UplinkForPUSCH-MappingTypeB-ForDCI format 0-2, is configured to support multi-port transmission, and it is configured (or determined) according to the DMRS configuration parameter that an antenna port field in DCI format 0-2 is 3-bit.

A DMRS configuration parameter in ConfiguredGrantConfig, such as cg-DMRS-Configuration, may also be configured to support multi-port transmission, and a corresponding antenna port field is 4-bit.

It is to be noted that operation 41 is optional. For example, the first transmission parameter and/or the second transmission parameter may be pre-configured in the terminal. For another example, when the first transmission parameter and/or the second transmission parameter remain/remains unchanged, the terminal needs to receive the first transmission parameter and/or the second transmission parameter only once from the network side, and does not need to perform operation 41 before operation 42 every time.

In operation 42, the terminal receives DCI for CG activation.

The DCI for CG activation may be understood as DCI with Cyclic Redundancy Check (CRC) scrambled by Configured Scheduling Radio Network Temporary Identifier (CS-RNTI) with New Data Indication (NDI)=0.

A number of bits for each field is determined according to PUSCH-Config, and each field of the DCI for CG activation is parsed according to parameter configurations in ConfiguredGrantConfig and/or PUSCH-Config.

Here, the same method is used for determining the number of bits for the first DCI field at the network device and terminal device sides, and may be determining the number of bits for the first DCI field according to the second transmission parameter.

Specifically, the terminal device may parse the first DCI field of the DCI according to the target transmission parameter, which corresponds to the minimum number of bits determined according to the two parameters.

In addition, the network device may configure the first DCI field of the DCI according to the target transmission parameter, which corresponds to the minimum number of bits determined according to the two parameters.

For example, the terminal device receives DCI for CG activation. A format of the DCI may be DCI format 0-2.

It is determined that the first DCI field (taking the antenna port field as an example of the first DCI field) is 3-bit according to a DMRS configuration parameter for DCI format 0-2 in PUSCH-Config (i.e., the second transmission parameter), such as dmrs-UplinkForPUSCH-MappingTypeA and dmrs-UplinkForPUSCH-MappingTypeB.

It is determined that the antenna port field is 4-bit according to a DMRS configuration parameter in ConfiguredGrantConfig (i.e., the first transmission parameter), such as cg-DMRS-Configuration.

In the operation, the terminal determines first that a number of bits for the antenna port field (i.e., the first DCI field) is 3 bits according to PUSCH-Config (i.e., the second transmission parameter).

The number of bits for the antenna port field determined according to PUSCH-Config (i.e., the second transmission parameter) is minimum, thus three bits for the antenna port field are parsed according to PUSCH-Config (i.e., the second transmission parameter).

It is also to be pointed out that, although the above-mentioned example takes a DMRS port parameter as an example, in practical processing, the target transmission parameter may include, but not limited to, at least one of the following parameters: a frequency-domain frequency hopping parameter (such as frequencyHopping), a frequency-domain resource parameter (such as resourceAllocationType1-Granularity), a parameter for multiplexing UCI to a PUSCH (such as uci-onPUSCH), a DMRS sequence initialization parameter (such as DMRSsequenceinitialization), and a DMRS port related parameter.

Certainly, besides the parameters listed above, the target transmission parameter may further include more parameters, which may be set according to an actual situation and will not be exhausted herein.

Finally, as described above, the first DCI field may be one of multiple DCI fields, so another DCI field in the multiple DCI fields may also be used as the first DCI field. In such case, the same method as provided in the example may be used for processing, and elaborations are omitted herein. In addition, the multiple DCI fields may be processed as first DCI fields respectively, so different target transmission parameters may be determined for different first DCI fields. For example, a target transmission parameter determined for a certain first DCI field is the first transmission parameter, and a target transmission parameter determined for another first DCI field may be the second transmission parameter.

Example 2: when the first transmission parameter (such as a CG transmission parameter) is different from the second transmission parameter (such as an uplink data transmission parameter), bits for the first DCI field are determined according to the second transmission parameter, and the first DCI field is parsed according to part (or all) of the first transmission parameter.

That is, the target transmission parameter consists of at least one first transmission parameter in case that the DCI is DCI for CG activation. Alternatively, the target transmission parameter includes at least one first transmission parameter and at least one second transmission parameter in case that the DCI is DCI for CG activation.

Here, that the target transmission parameter consists of at least one first transmission parameter and at least one second transmission parameter may be understood as that the target transmission parameter consists of at least one first transmission parameter and at least one second transmission parameter.

The solution provided in the example may include the following operations.

In the first operation, the terminal device receives a first transmission parameter and a second transmission parameter. Correspondingly, the network device sends the first transmission parameter and the second transmission parameter to the terminal device.

For example, the terminal device receives ConfiguredGrantConfig and PUSCH-Config.

In the second operation, the terminal device receives DCI for CG activation.

At the terminal device side, for a first DCI field in the DCI for CG activation, the terminal device may determine a number of bits according to the second transmission parameter, and perform parsing according to at least one first transmission parameter or according to the at least one first transmission parameter and at least one second transmission parameter. Alternatively, at the network device side, for a first DCI field in the DCI for CG activation, the network device determines a number of bits according to the second transmission parameter, and performs setting or configuration according to at least one first transmission parameter or according to the at least one first transmission parameter and at least one second transmission parameter.

Since the first DCI field may be all or part of DCI fields in the DCI, it can be understood that a number of bits for each field in the DCI is determined according to PUSCH-Config and each field in the DCI is parsed according to ConfiguredGrantConfig.

For example, the DCI for CG activation received by the terminal device is in DCI format 0-2.

It is determined that an antenna port field is 3-bit according to a DMRS configuration parameter for DCI format 0-2 in PUSCH-Config, such as dmrs-UplinkForPUSCH-MappingTypeA and dmrs-UplinkForPUSCH-MappingTypeB. It is determined that the corresponding antenna port field is 4-bit according to a DMRS configuration parameter in ConfiguredGrantConfig, such as cg-DMRS-Configuration, corresponding antenna ports being (0, 1, 2, 3, 4, 0-1, 2-3, 4-5, 6-7, 0-3, 5-7, 0-7, 0-5}.

Three bits in the antenna port field are parsed according to ConfiguredGrantConfig, that is, the three bits correspond to the first eight configuration values.

In the example, the first DCI field may be parsed according to the first transmission parameter, or be parsed according to the first transmission parameter and the second transmission parameter.

The method of parsing with one transmission parameter (parsing with the first or second transmission parameter) has been described above, and thus will not be elaborated.

The processing of parsing the first DCI field using at least one first transmission parameter and at least one second transmission parameter may be described with an example. There is made such a hypothesis that the first DCI field is a frequency domain resource assignment field, and may be jointly parsed according to resource allocation Resource Block Group (RGB) size in the CG transmission parameter and parameter ResourceAllocationType1-granularity-ForDCIFormat0_2 in the PUSCH transmission parameter.

For another example, the first DCI field is a DMRS sequence initialization field, and may be parsed according to both transform precoder in the CG transmission parameter and DMRSsequenceinitialization-ForDCIFormat0_2 in the PUSCH transmission parameter.

It is also to be pointed out that, although the above-mentioned example takes a DMRS port parameter as an example, in practical processing, the target transmission parameter may include, but not limited to, at least one of the following parameters: a frequency-domain frequency hopping parameter (such as frequencyHopping), a frequency-domain resource parameter (such as resourceAllocation-Type1-Granularity), a parameter for multiplexing UCI to a PUSCH (such as uci-onPUSCH), a DMRS sequence initialization parameter (such as DMRSsequenceinitialization), and a DMRS port related parameter.

Certainly, besides the parameters listed above, the target transmission parameter may further include more parameters, which may be set according to an actual situation and will not be exhausted herein.

Example 3: when the first transmission parameter (such as a CG transmission parameter) is different from the second transmission parameter (such as an uplink data transmission parameter), bits for the first DCI field are determined according to the second transmission parameter, and the first DCI field is parsed according to part (or all) of the second transmission parameter.

It is to be pointed out that the solution of the example is particularly applicable for the processing of DCI for CG retransmission.

The target transmission parameter includes at least one second transmission parameter in case that the DCI is DCI for CG retransmission scheduling. That is, the target transmission parameter may consist of at least one second transmission parameter.

The DCI for CG retransmission scheduling may be DCI with CRC scrambled by CS-RNTI with NDI=1.

Specifically, the example may include the following operations.

In the first operation, the terminal device receives a first transmission parameter and a second transmission parameter. Correspondingly, the network device sends the first transmission parameter and the second transmission parameter to the terminal device.

For example, the terminal device receives ConfiguredGrantConfig and PUSCH-Config.

In the second operation, the terminal device receives DCI for CG retransmission scheduling.

At the terminal device side, for a first DCI field in the DCI for CG activation, the terminal device may determine a number of bits according to the second transmission parameter, and perform parsing according to at least one second transmission parameter. Alternatively, at the network device side, for a first DCI field in the DCI for CG activation, the network device determines a number of bits according to the second transmission parameter, and performs setting or configuration according to at least one second transmission parameter.

That is, the terminal device may determine a number of bits for each field according to PUSCH-Config, and parse each field in the DCI according to PUSCH-Config.

The above-mentioned target transmission parameter may refer to all or part of CG transmission parameters, or all or part of CG transmission parameters affecting bits for the DCI field. The target transmission parameter may include, but not limited to, at least one of the following parameters: a frequency-domain frequency hopping parameter (such as frequencyHopping), a frequency-domain resource parameter (such as resourceAllocationType1-Granularity), a parameter for multiplexing UCI to a PUSCH (such as uci-onPUSCH), a DMRS sequence initialization parameter (such as DMRSsequenceinitialization), and a DMRS port related parameter.

Based on examples 1, 2, and 3, it is further to be noted that examples 1 and 3 may be combined for use, or examples 2 and 3 may be combined for use. That is, during the processing of the DCI for CG activation, example 1 or example 2 may be used, and during the further processing of the DCI for CG retransmission scheduling, example 3 may be used.

It can be seen that, according to the above-mentioned solutions, a DCI field in DCI can be parsed by using a first transmission parameter and/or a second transmission parameter. Therefore, the problem of how to determine a number of bits for DCI (including DCI for CG activation and DCI for retransmission) for parsing is solved.

Figure 5:
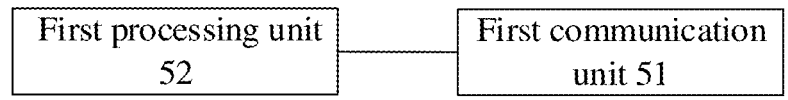
FIG. 5 is a schematic diagram of a composition structure of a terminal device according to an embodiment of the present disclosure.

An embodiment of the present disclosure provides a terminal device. As illustrated in FIG. 5, the terminal device includes a first communication unit 51 and a first processing unit 52.

The first communication unit 51 receives DCI.

The first processing unit 52 parses a first DCI field in the DCI using a target transmission parameter configuration set, the DCI including at least one DCI field, and the first DCI field being one of the at least one DCI field.

The target transmission parameter may be one or more parameters, or a parameter set. The target transmission parameter may be pre-configured in the terminal, or may be configured for the terminal by a network device.

The target transmission parameter may include at least one first transmission parameter, or at least one second transmission parameter, or at least one first transmission parameter and at least one second transmission parameter.

Figure 6:
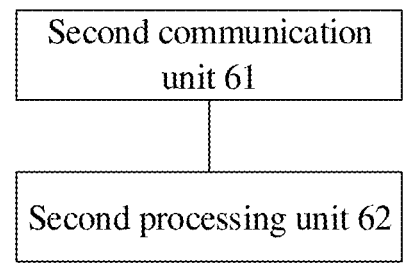
FIG. 6 is a schematic diagram of a composition structure of a network device according to an embodiment of the present disclosure.

If the target transmission parameter is configured for the terminal by the network device, the embodiment of the present disclosure also provides a network device. As illustrated in FIG. 6, the network device includes a second communication unit 61.

The second communication unit 61 sends DCI, a first DCI field in the DCI being determined according to a target transmission parameter configuration set, the DCI including at least one DCI field, and the first DCI field being one of the at least one DCI field.

The target transmission parameter consists of at least one first transmission parameter, or at least one second transmission parameter, or at least one first transmission parameter and at least one second transmission parameter.

The composition of the target transmission parameter may refer to the related descriptions in the above embodiment. When the target transmission parameter includes at least one first transmission parameter and at least one second transmission parameter, the first transmission parameter is the same as or different from the second transmission parameter. The solution provided in the embodiment of the application is particularly applied to a scenario where the first transmission parameter is different from the second transmission parameter.

The first transmission parameter is a CG transmission parameter. The second transmission parameter is an uplink data transmission parameter or predetermined in a protocol.

The uplink data transmission parameter may be a PUSCH transmission parameter.

The first DCI field is one of all DCI fields included in the DCI. Alternatively, the first DCI field is one of part of DCI fields included in the DCI.

In the embodiment, the number of bits for the first DCI field is determined according to the at least one second transmission parameter. That is, the number of bits for the first DCI field may be determined in the following manner the first processing unit 52 of the terminal device determines the number of bits for the first DCI field according to the at least one second transmission parameter. Alternatively, a second processing unit 62 of the network device may determine the number of bits for the first DCI field according to the at least one second transmission parameter.

The first processing unit 52 of the terminal device parses the first DCI field by using the target transmission parameter according to the number of bits for the first DCI field.

Correspondingly, the second processing unit 62 of the network device may configure the first DCI field according to the determined number of bits for the first DCI field and the target transmission parameter.

Based on the above, the solution provided in the embodiment will be described in detail in combination with the following several examples.

Example 1

When the first transmission parameter (such as a CG transmission parameter) is different from the second transmission parameter (such as an uplink data transmission parameter), bits for the first DCI field are determined according to the uplink data transmission parameter, and the first DCI field is parsed according to a minimum bit configuration of the first DCI field.

Specifically,
the first communication unit 51 of the terminal device receives a first transmission parameter and a second transmission parameter. Correspondingly, the second communication unit 61 of the network device sends the first transmission parameter and the second transmission parameter to the terminal device.

The first communication unit 51 of the terminal device receives DCI for CG activation. Correspondingly, the second communication unit 61 of the network device sends the DCI for CG activation.

The DCI for CG activation may be understood as DCI with CRC scrambled by CS-RNTI with NDI=0.

The first processing unit 52 of the terminal device determines the number of bits for each field according to PUSCH-Config, and parses each field of the DCI for CG activation according to parameters in ConfiguredGrantConfig and/or PUSCH-Config.

Here, the same method is used for determining the number of bits for the first DCI field at the network device and terminal device sides, and may be determining the number of bits for the first DCI field according to the second transmission parameter.

Further, a first number of bits for the first DCI field is determined according to the at least one first transmission parameter, and a second number of bits for the first DCI field is determined according to the at least one second transmission parameter.

The target transmission parameter is the at least one first transmission parameter or at least one second transmission parameter, which corresponds to the minimum one between the first number of bits and the second number of bits.

Specifically, the first processing unit 52 of the terminal device may parse the first DCI field of the DCI according to the target transmission parameter, which corresponds to the minimum one between the number of bits determined according to the two parameters.

In addition, the second processing unit 62 of the network device may configure the first DCI field of the DCI according to the target transmission parameter, which corresponds to the minimum one between the number of bits determined according to the two parameters.

The target transmission parameter may include, but not limited to, at least one of the following parameters: a frequency-domain frequency hopping parameter (such as frequencyHopping), a frequency-domain resource parameter (such as resourceAllocationType1-Granularity), a parameter for multiplexing UCI to a PUSCH (such as uci-onPUSCH), a DMRS sequence initialization parameter (such as DMRSsequenceinitialization), and a DMRS port related parameter.

Example 2: when the first transmission parameter (such as a CG transmission parameter) is different from the second transmission parameter (such as an uplink data transmission parameter), bits for the first DCI field are determined according to the second transmission parameter, and the first DCI field is parsed according to part (or all) of the first transmission parameter.

That is, the target transmission parameter configuration set consists of at least one first transmission parameter in case that the DCI is DCI for CG activation. Alternatively, the target transmission parameter includes at least one first transmission parameter and at least one second transmission parameter in case that the DCI is DCI for CG activation.

Here, that the target transmission parameter consists of at least one first transmission parameter and at least one second transmission parameter may be understood as that the target transmission parameter configuration set consists of at least one first transmission parameter and at least one second transmission parameter.

The example differs from the above-mentioned example as follows.

At the terminal device side, for a first DCI field in the DCI for CG activation, the first processing unit 52 of the terminal device may determine a number of bits according to the second transmission parameter, and perform parsing according to at least one first transmission parameter or according to the at least one first transmission parameter and at least one second transmission parameter. Alternatively, at the network device side, for a first DCI field in the DCI for CG activation, the second processing unit 62 of the network device determines a number of bits according to the second transmission parameter, and performs setting or configuration according to at least one first transmission parameter or according to the at least one first transmission parameter and at least one second transmission parameter.

Since the first DCI field may be all or part of DCI fields in the DCI, it can be understood that a number of bits for each field in the DCI is determined according to PUSCH-Config and each field in the DCI is parsed according to ConfiguredGrantConfig.

Example 3: when the first transmission parameter (such as a CG transmission parameter) is different from the second transmission parameter (such as an uplink data transmission parameter), bits for the first DCI field are determined according to the second transmission parameter, and the first DCI field is parsed according to part (or all) of the second transmission parameter.

It is to be pointed out that the solution of the example is particularly applicable for the processing of DCI for CG retransmission.

The target transmission parameter includes at least one second transmission parameter in case that the DCI is DCI for CG retransmission scheduling. That is, the target transmission parameter set may consist of at least one second transmission parameter.

The DCI for CG retransmission scheduling may be DCI with CRC scrambled by CS-RNTI with NDI=1.

Specifically, the first communication unit 51 of the terminal device receives DCI for CG retransmission scheduling.

At the terminal device side, for a first DCI field in the DCI for CG activation, the first processing unit 52 of the terminal device may determine a number of bits according to the second transmission parameter, and perform parsing according to at least one second transmission parameter. Alternatively, at the network device side, for a first DCI field in the DCI for CG activation, the second processing unit 62 of the network device determines a number of bits according to the second transmission parameter, and performs setting or configuration according to at least one second transmission parameter.

The above-mentioned target transmission parameter may refer to all or part of CG transmission parameters, or all or part of CG transmission parameters affecting bits for the DCI field. The target transmission parameter configuration set may include, but not limited to, at least one of the following parameters: a frequency-domain frequency hopping parameter (such as frequencyHopping), a frequency-domain resource parameter (such as resourceAllocation-Type1-Granularity), a parameter for multiplexing UCI to a PUSCH (such as uci-onPUSCH), a DMRS sequence initialization parameter (such as DMRSsequenceinitialization), and a DMRS port related parameter.

Based on examples 1, 2, and 3, it is further to be noted that examples 1 and 3 may be combined for use, or examples 2 and 3 may be combined for use. That is, during the processing of the DCI for CG activation, example 1 or example 2 may be used, and during the further processing of the DCI for CG retransmission scheduling, example 3 may be used.

It can be seen that, according to the above-mentioned solutions, a DCI field in DCI can be parsed by using a first transmission parameter and/or a second transmission parameter. Therefore, the problem of how to determine a number of bits for DCI (including DCI for CG activation and DCI for retransmission) for parsing is solved.

Figure 7:
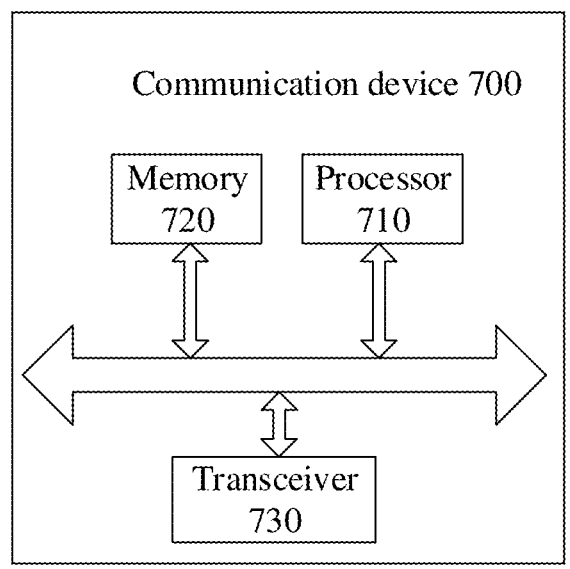
FIG. 7 is a schematic diagram of a composition structure of a communication device according to an embodiment of the present disclosure.

FIG. 7 is a schematic diagram of a structure of a communication device 700 according to an embodiment of the present disclosure. The communication device in the embodiment may specifically be one of the terminal device and network device in the above-mentioned embodiment. The communication device 700 illustrated in FIG. 7 includes a processor 710. The processor 710 may call and run a computer program in a memory to implement the method in the embodiments of the present disclosure.

Optionally, as illustrated in FIG. 7, the communication device 700 may further include the memory 720. The processor 710 may call and run the computer program in the memory 720 to implement the method in the embodiments of the present disclosure.

The memory 720 may be an independent device independent of the processor 710, or may be integrated into the processor 710.

Optionally, as illustrated in FIG. 7, the communication device 700 may further include a transceiver 730. The processor 710 may control the transceiver 730 to communicate with another device, specifically sending information or data to the other device or receiving information or data sent by the other device.

The transceiver 730 may include a transmitter and a receiver. The transceiver 730 may further include antennae. The number of the antennae may be one or more.

Optionally, the communication device 700 may specifically be the network device of the embodiments of the present disclosure. The communication device 700 may implement corresponding flows implemented by the network device in each method of the embodiments of the present disclosure. For simplicity, elaborations are omitted herein.

Optionally, the communication device 700 may specifically be the terminal device or network device of the embodiments of the present disclosure. The communication device 700 may implement corresponding flows implemented by the mobile terminal/terminal device in each method of the embodiments of the present disclosure. For simplicity, elaborations are omitted herein.

For example, the first processing unit of the terminal device may be implemented by the processor 710 in the communication device 700. Alternatively, the second processing unit of the network device may be implemented by the processor 710 in the communication device 700.

The first communication unit of the terminal device may be implemented by the transceiver 730 in the communication device 700. Alternatively, the second communication unit of the network device may be implemented by the transceiver 730 in the communication device 700.

Figure 8:
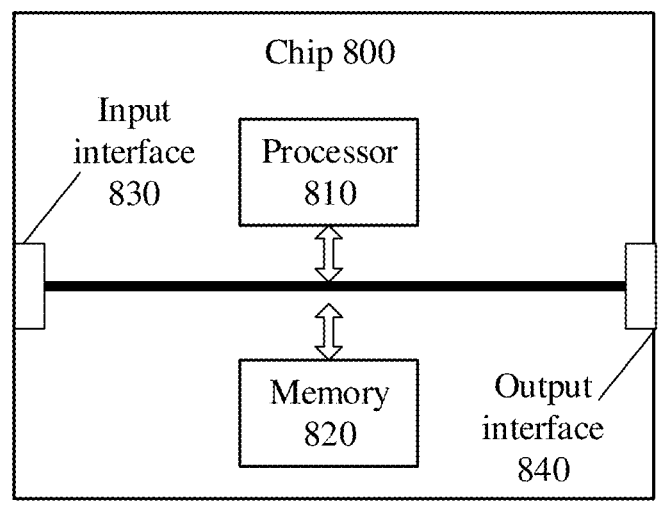
FIG. 8 is a schematic block diagram of a chip according to an embodiment of the application.

FIG. 8 is a schematic diagram of a structure of a chip according to an embodiment of the present disclosure. The chip 800 illustrated in FIG. 8 includes a processor 810. The processor 810 may call and run a computer program in a memory to implement the method in the embodiments of the present disclosure.

Optionally, as illustrated in FIG. 8, the chip 800 may further include the memory 820. The processor 810 may call and run the computer program in the memory 820 to implement the method in the embodiments of the present disclosure.

The memory 820 may be an independent device independent of the processor 810, or may be integrated into the processor 810.

Optionally, the chip 800 may further include an input interface 830. The processor 810 may control the input interface 830 to communicate with another device or chip, specifically acquiring information or data sent by the other device or chip.

Optionally, the chip 800 may further include an output interface 840. The processor 810 may control the output interface 840 to communicate with the other device or chip, specifically outputting information or data to the other device or chip.

Optionally, the chip may be applied to one of the terminal device, access network node, and core network device in the embodiments of the present disclosure, and the chip may implement corresponding flows implemented by the terminal device in each method of the embodiments of the present disclosure. For simplicity, elaborations are omitted herein.

It is to be understood that the chip mentioned in the embodiment of the present disclosure may also referred to as a system-level chip, a system chip, a chip system, a system on chip, or the like.

It is to be understood that the processor in the embodiment of the present disclosure may be an integrated circuit chip with a signal processing capacity. During implementation, each step of the method embodiments may be completed by an integrated logical circuit in a hardware form in the processor or an instruction in a software form. The processor may be a general-purpose processor, a Digital Signal Processor (DSP), an Application Specific Integrated Circuit (ASIC), a Field Programmable Gate Array (FPGA) or another programmable logic device, a discrete gate or transistor logic device, and a discrete hardware component, and may implement or execute each method, step, and logical block diagram disclosed in the embodiment of the present disclosure. The general-purpose processor may be a microprocessor. Alternatively, the processor may be any conventional processor, etc. The steps of the method disclosed in combination with the embodiment of the present disclosure may be directly embodied to be executed and completed by a hardware decoding processor or by a combination of hardware and software modules in the decoding processor. The software module may be in a mature storage medium in this field, such as a Random Access Memory (RAM), a flash memory, a Read-Only Memory (ROM), a Programmable ROM (PROM), or Electrically Erasable PROM (EEPROM), and a register. The storage medium is in a memory. The processor reads information in the memory and completes the steps of the method in combination with hardware.

It can be understood that the memory in the embodiment of the present disclosure may be a volatile memory or a nonvolatile memory, or may include both the volatile and nonvolatile memories. The nonvolatile memory may be a ROM, a PROM, an Erasable PROM (EPROM), an EEPROM, or a flash memory. The volatile memory may be a RAM, and is used as an external high-speed cache. It is exemplarily but unlimitedly described that RAMs in various forms may be used, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It is to be noted that the memory of the system and method described herein is intended to include, but not limited to, memories of these and any other proper types.

It is to be understood that the memory is exemplarily but unlimitedly described. For example, the memory in the embodiments of the present disclosure may also be an SRAM, a DRAM, an SDRAM, a DDR SDRAM, an ESDRAM, an SLDRAM, and a DR RAM. That is, the memory in the embodiments of the present disclosure is intended to include, but not limited to, memories of these and any other proper types.

Figure 9:
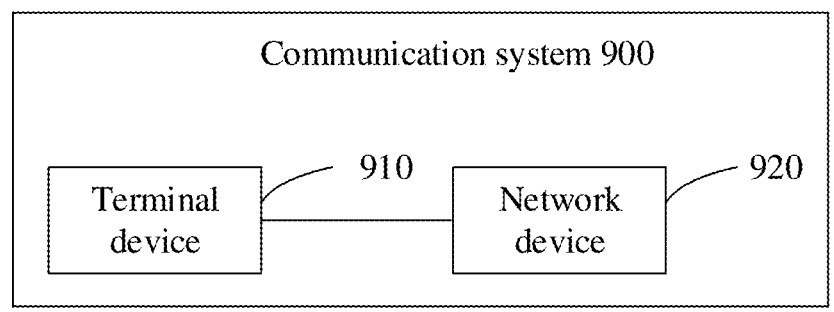
FIG. 9 is a second schematic diagram of an architecture of a communication system according to an embodiment of the application.

FIG. 9 is a schematic block diagram of a communication system 900 according to an embodiment of the application. As illustrated in FIG. 9, the communication system 900 includes a terminal device 910 and a network device 920.

The terminal device 910 may be configured to realize corresponding functions realized by UE in the method. The network device 920 may be configured to realize corresponding functions realized by the network device in the method. For simplicity, elaborations are omitted herein. The network device may be one of an access network node and a core network device.

An embodiment of the present disclosure also provides a computer-readable storage medium, which is configured to store a computer program.

Optionally, the computer-readable storage medium may be applied to a network device or terminal device in the embodiments of the present disclosure. The computer program causes a computer to execute corresponding flows implemented by the network device in each method of the embodiments of the present disclosure. For simplicity, elaborations are omitted herein.

An embodiment of the present disclosure also provides a computer program product, which includes computer program instructions.

Optionally, the computer program product may be applied to a network device or terminal device in the embodiments of the present disclosure. The computer program instructions cause a computer to execute corresponding flows implemented by the network device in each method of the embodiments of the present disclosure. For simplicity, elaborations are omitted herein.

An embodiment of the present disclosure also provides a computer program.

Optionally, the computer program may be applied to a network device or terminal device in the embodiments of the present disclosure, and runs in a computer to cause the computer to execute corresponding flows implemented by the network device in each method of the embodiments of the present disclosure. For simplicity, elaborations are omitted herein.

Those of ordinary skill in the art may realize that the units and algorithm steps of each example described in combination with the embodiments disclosed in the present disclosure may be implemented by electronic hardware or a combination of computer software and electronic hardware. Whether these functions are executed by hardware or software depends on specific applications and design constraints of the technical solutions. Professionals may realize the described functions for each specific application by use of different methods, but such realization shall fall within the scope of the present disclosure.

Those skilled in the art may clearly know that specific working processes of the system, device, and unit described above may refer to the corresponding processes in the method embodiment and will not be elaborated herein for ease and brevity of description.

In some embodiments provided by the present disclosure, it is to be understood that the disclosed system, device, and method may be implemented in another manner. For example, the apparatus embodiment described above is only schematic. For example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the apparatus or the units, and may be electrical and mechanical or adopt other forms.

The units described as separate parts may or may not be physically separated. Parts displayed as units may or may not be physical units, namely they may be located in the same place, or may be distributed to multiple network units.

Part or all of the units may be selected to achieve the purposes of the solutions of the embodiments as practically required.

In addition, each function unit in each embodiment of the present disclosure may be integrated into a processing unit. Alternatively, each unit may physically exist independently. Two or more than two units may be integrated into a unit.

The function may also be stored in a computer-readable storage medium when being realized in form of a software function unit and sold or used as an independent product. Based on such an understanding, the technical solutions of the present disclosure substantially or parts making contributions to the conventional art or part of the technical solutions may be embodied in form of a software product. The computer software product is stored in a storage medium, including a plurality of instructions for causing a computer device (which may be a personal computer, a server, a network device, etc.) to execute all or part of the steps of the method in each embodiment of the present disclosure. The above-mentioned storage medium includes various media capable of storing program codes, such as a U disk, a mobile hard disk, a ROM, a RAM, a magnetic disk, or an optical disk.

The above is only the specific implementation mode of the present disclosure and not intended to limit the scope of protection of the present disclosure. Any variations or replacements apparent to those skilled in the art within the technical scope disclosed by the present disclosure shall fall within the scope of protection of the present disclosure. Therefore, the scope of protection of the present disclosure shall be subject to the scope of protection of the claims.

The invention claimed is:

1. A method for receiving information, comprising:
    receiving, by a terminal device, Downlink Control Information (DCI), and determining, by the terminal device, a number of bits for a first DCI field in the DCI by using a target transmission parameter, the first DCI field being a frequency domain resource assignment field, the DCI comprising at least one DCI field, and the first DCI field being one of the at least one DCI field,
    wherein when the DCI is used for CG activation, a first number of bits for the first DCI field is determined according to at least one first transmission parameter, and a second number of bits for the first DCI field is determined according to at least one second transmission parameter; and
    the target transmission parameter is at least one first transmission parameter or at least one second transmission parameter, which corresponds to a minimum one between the first number of bits and the second number of bits,
    wherein the first transmission parameter is a Configured Grant (CG) transmission parameter configured by ConfiguredGrantConfig, and the second transmission parameter is a Physical Uplink Share Channel (PUSCH) transmission parameter configured by PUSCH-Config.

2. The method of claim 1, wherein
    the first DCI field is one of all DCI fields comprised in the DCI; or
    the first DCI field is one of part of DCI fields comprised in the DCI.

3. The method of claim 2, wherein
    the target transmission parameter comprises the at least one second transmission parameter when the DCI is used for CG retransmission scheduling.

4. The method of claim 1, wherein the target transmission parameter comprises one of:
    a Demodulation Reference Signal (DMRS) port related parameter, a frequency-domain frequency hopping parameter, a frequency-domain resource parameter, a parameter for multiplexing Uplink Control Information (UCI) to a Physical Uplink Shared Channel (PUSCH), and a DMRS sequence initialization parameter.

5. A terminal device, comprising a processor and a memory configured to store a computer program capable of running on the processor,
    wherein the memory is configured to perform operations of:
    receiving Downlink Control Information (DCI); and
    determining a number of bits for a first DCI field in the DCI by using a target transmission parameter, the first DCI field being a frequency domain resource assignment field, the DCI comprising at least one DCI field, and the first DCI field being one of the at least one DCI field,
    wherein when the DCI is used for CG activation, a first number of bits for the first DCI field is determined according to at least one first transmission parameter, and a second number of bits for the first DCI field is determined according to at least one second transmission parameter; and
    the target transmission parameter is at least one first transmission parameter or at least one second transmission parameter, which corresponds to a minimum one between the first number of bits and the second number of bits,
    wherein the first transmission parameter is a Configured Grant (CG) transmission parameter configured by ConfiguredGrantConfig, and the second transmission parameter is a Physical Uplink Share Channel (PUSCH) transmission parameter configured by PUSCH-Config.

6. The terminal device of claim 5, wherein
    the first DCI field is one of all DCI fields comprised in the DCI; or,
    the first DCI field is one of part of DCI fields comprised in the DCI.

7. The terminal device of claim 6, wherein
    the target transmission parameter comprises the at least one second transmission parameter when the DCI is used for CG retransmission scheduling.

8. The terminal device of claim 5, wherein the target transmission parameter comprises one of:
    a Demodulation Reference Signal (DMRS) port related parameter, a frequency-domain frequency hopping parameter, a frequency-domain resource parameter, a parameter for multiplexing Uplink Control Information (UCI) to a Physical Uplink Shared Channel (PUSCH), and a DMRS sequence initialization parameter.

9. A network device, comprising a processor and a memory configured to store a computer program capable of running on the processor,
    wherein the memory is configured to perform operations of:
    sending Downlink Control Information (DCI), a number of bits for a first DCI field in the DCI being determined according to a target transmission parameter, the first DCI field being a frequency domain resource assignment field, the DCI comprising at least one DCI field, and the first DCI field being one of the at least one DCI field, when the DCI is used for CG activation, a first number of bits for the first DCI field is determined according to at least one first transmission parameter, and a second number of bits for the first DCI field is determined according to at least one second transmission parameter; and the target transmission parameter is at least one first transmission parameter or at least one second transmission parameter, which corresponds to a minimum one between the first number of bits and the second number of bits, wherein the first transmission parameter is a Configured Grant (CG) transmission parameter configured by ConfiguredGrantConfig, and the second transmission parameter is a Physical Uplink Share Channel (PUSCH) transmission parameter configured by PUSCH-Config.

10. The network device of claim 9, wherein the second communication unit sends the first transmission parameter and the second transmission parameter.

11. The network device of claim 9, wherein the first DCI field is one of all DCI fields comprised in the DCI; or, the first DCI field is one of part of DCI fields comprised in the DCI.

12. The network device of claim 11, wherein the target transmission parameter comprises the at least one second transmission parameter when the DCI is used for CG retransmission scheduling.

13. The network device of claim 9, wherein the target transmission parameter comprises one of:

a Demodulation Reference Signal (DMRS) port related parameter, a frequency-domain frequency hopping parameter, a frequency-domain resource parameter, a parameter for multiplexing Uplink Control Information (UCI) to a Physical Uplink Shared Channel (PUSCH), and a DMRS sequence initialization parameter.

* * * * *